Feb. 12, 1924.
W. P. DE SAUSSURE, JR
1,483,215
VISIBLE INDEX
Filed Aug. 31, 1921
2 Sheets-Sheet 1
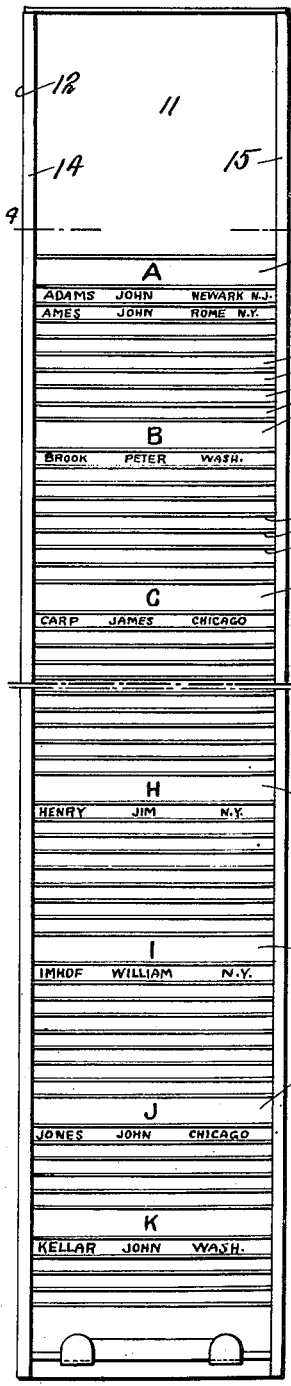
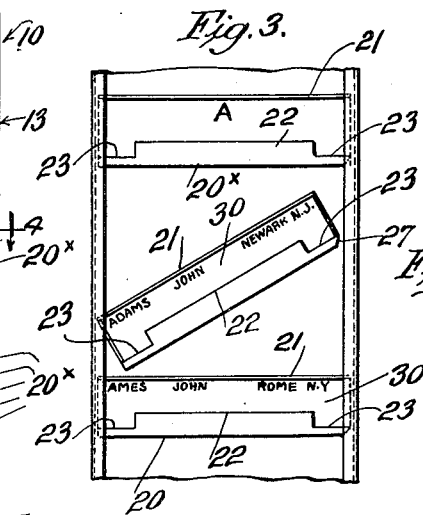
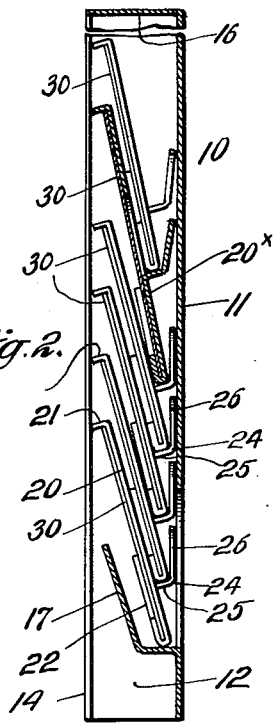
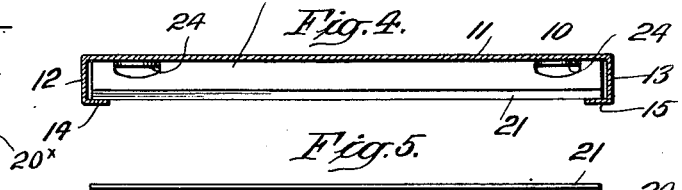
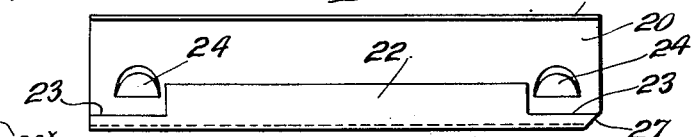
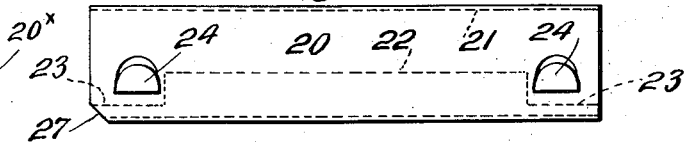
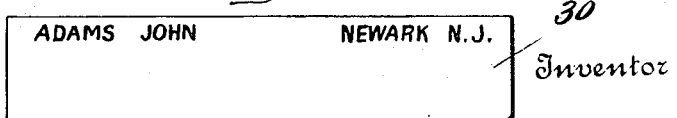

Feb. 12, 1924. 1,483,215
W. P. DE SAUSSURE, JR
VISIBLE INDEX
Filed Aug. 31, 1921  2 Sheets-Sheet 2
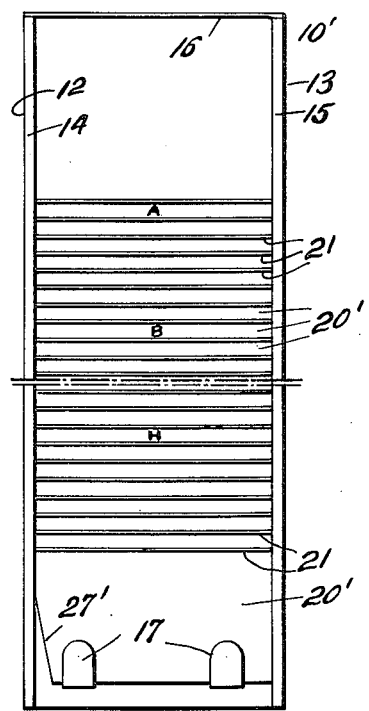
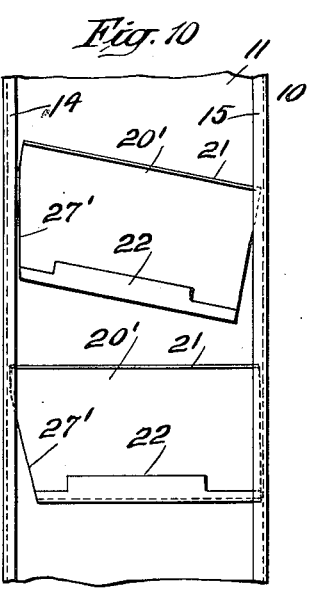
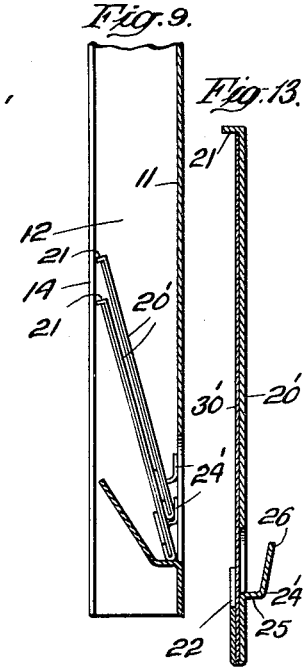
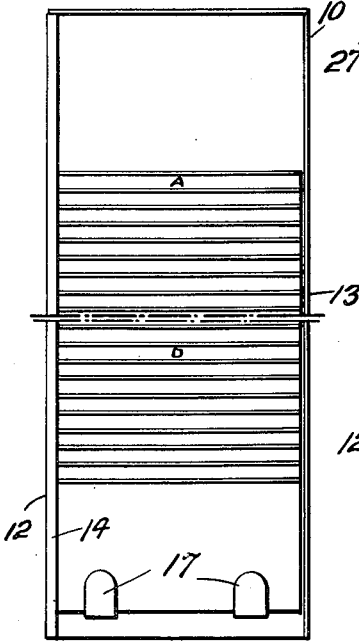
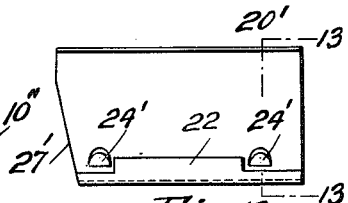
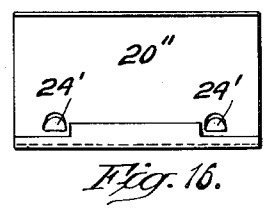
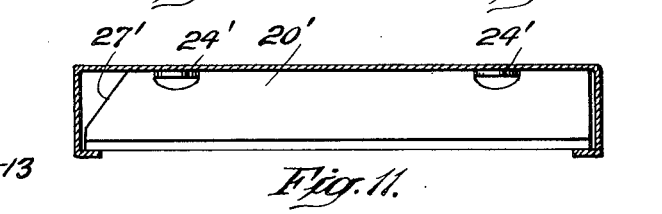
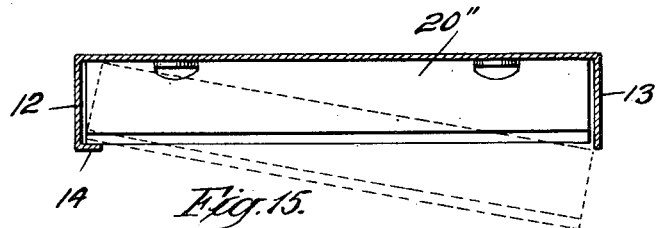
Inventor
William P. DeSaussure Jr.
By Arthur L. Kent
his Atty.

Patented Feb. 12, 1924.

1,483,215

UNITED STATES PATENT OFFICE.

WILLIAM P. DE SAUSSURE, JR., OF ENGLEWOOD, NEW JERSEY.

VISIBLE INDEX.

Application filed August 31, 1921. Serial No. 497,154.

*To all whom it may concern:*

Be it known that I, WILLIAM P. DE SAUSSURE, Jr., a citizen of the United States, residing at Englewood, in the county of Bergen and State of New Jersey, have invented certain new and useful Improvements in Visible Indexes, fully described and represented in the following specification and the accompanying drawings, forming a part of the same.

This invention relates to visible indexes or information racks, and has for an object to improve the operation of devices heretofore used for this purpose while at the same time reducing the expense of their manufacture.

The invention relates to the general type of visible index shown in Patent No. 1,106,344, issued to William P. De Saussure, Jr. and George S. Tiffany on August 4, 1914. The index shown in that patent comprises a rack constructed of two rails and a series of card holders adapted to be placed in said rails and each provided with a rear socket adapted to receive the lower edge of the holder above. The socket of each holder is formed by a lip or keeper which extends parallel to the body of the holder and serves to retain the holder above in operative position, i. e., tipped forward parallel to the holder having the socket. Some difficulty has been experienced in the operation of such indexes in obtaining a quick and ready engagement between the lower edge of any card holder and the socket of the card holder below owing to the fact that it was necessary to make the lip forming the socket parallel to the body of the holder so that the entrance to the socket was spaced inwardly from the inner edge of the rails, and there was in consequence nothing to prevent the lower edge of a falling card holder from falling behind the entrance to the socket of the holder below and thus failing to enter it. Also, in the holders shown in said patent the card-retaining pocket on the front of the holder was directly in front of the rear or keeper pocket so that it was necessary to punch out the keeper pocket before bending the sheet material of which the holder was made to form the front card-retaining pocket.

In accordance with the present invention, the rack in which the card holders are placed is provided with a back and each card holder is retained in operative forwardly-tipped position by the engagement of its lower edge with a projection on the rear of the holder below and the engagement of its own rearward projection with the back of the rack. It is therefore unnecessary to provide a close fitting pocket on the back of each holder to receive and position the holder above. It is merely necessary to provide each holder with a rearward projection which will support the lower edge of the holder above and will at the same time engage the back of the rack. While the rearward projection may comprise merely a support, it most desirably includes also an upwardly extending guiding portion which may be made to extend at an angle with a holder so as normally to lie close to the back of the rack. With such rearward projections extending back to the back of the rack it is impossible for any falling holder to fall behind the projection, and each holder thus always drops into proper operative position in the rack.

A further feature of the present invention consists in shortening the card-retaining flange and the rear projection so that the two are not opposite each other. It is in consequence possible to bend up the card-retaining flange before the rear projection is punched out, thus permitting the rear projections to be formed at any desired position vertically of the holders after the holders are otherwise completed.

A further feature of the invention comprises the provision of card holders of different widths having their rear projections positioned so that different depths of the cards are exposed to view, thus serving to emphasize certain cards in the indexes.

Other features and advantages of the invention are described in connection with the detailed description of the specific embodiments of the invention shown in the accompanying drawings in which—

Fig. 1 is a front elevation of a rack showing the cards and card holders in position therein;

Fig. 2 is a side elevation partly in section and on a larger scale, showing the rack, holders, and cards shown in Fig. 1;

Fig. 3 is a fragmentary front elevation illustrating the manner of inserting a card holder in the rack;

Fig. 4 is a horizontal section of the rack showing one of the card holders therein;

Fig. 5 is a front elevation of one of the card holders;

Fig. 6 is a rear elevation of one of the card holders;

Fig. 7 is a perspective view of one of the index cards;

Fig. 8 is a front elevation of the rack and card holders showing a modified form of card holder;

Fig. 9 is a side elevation partly in section of the rack, cards, and card holders, shown in Fig. 8;

Fig. 10 is a fragmentary front elevation of the rack showing the manner of placing therein one of the card holders shown in Fig. 8;

Fig. 11 is a horizontal section of the rack shown in Fig. 8 showing one of the card holders therein;

Fig. 12 is a front view of one of the card holders shown in Fig. 8;

Fig. 13 is an enlarged section on the line 13—13 of Fig. 12;

Fig. 14 is a front elevation of a modified form of rack and card holders;

Fig. 15 is a horizontal section of the rack shown in Fig. 14 showing one of the card holders therein and illustrating by dotted lines how card holders are placed in and removed from the rack; and Fig. 16 is a front elevation of one of the card holders shown in Fig. 14.

In the embodiment of the invention illustrated in Figs. 1 to 7, the rack 10, which is most desirably formed of sheet metal, comprises a flat back 11, two parallel sides 12 and 13, and two front flanges 14 and 15 extending inwardly from the sides. The upper end of the back 11 may be bent forward to provide a top 16 for the rack. A support for the lowermost card holder is provided at the bottom of the rack. This support may be formed like the top 16 but it is most desirably formed as shown in the drawings by two forward projections 17 which are stamped out from the material of the back 11.

Each card holder 20 is formed from a piece of sheet metal or other suitable material. Each holder has narrow forwardly projecting flange 21 at its top, and at the bottom this material is overturned to form an upwardly projecting card-retaining flange 22 on the front of the holder. The flange 22 is cut away at each end at 23, and projections 24 are stamped from the body of the holder 20 so as to project rearwardly therefrom.

In the form illustrated in the drawings each projection 24 has a short supporting portion 25 extending approximately perpendicularly from the body of the card holder and a guiding portion 26 extending upwardly and outwardly at an angle to the body of the card holder. The projection 24 extends rearward from the body of the holder sufficiently so that when the holder is positioned in the rack the projection will by engagement with the back of the rack prevent the holder from tipping backward from its inclined position. The depth to which each card holder is exposed when placed in the rack is determined by the difference between the width of the card holder and the distance between the supporting portions of the projections 24 and the upper edge of the card holder next below.

Having the front card-retaining flange 22 cut away at the ends, or so positioned lengthwise of the holder as not to interfere with the stamping out of the rear projections 24, has the advantage of making it possible to complete the holders except for the rear extensions and thereafter to form the rear extensions at any desired position vertically of the holders according to the desired width of the exposed portions of the cards when the holders are in the rack.

The index cards 30 have typewritten or otherwise marked on their upper portion the matter which is to be displayed, and if desired, additional data on their lower portion not to be displayed. Each card 30 is placed in one of the card holders 20 by inserting it between the flange 22 and the flange 21.

In making up an index by means of the apparatus which has been described, the cards 30 are first inserted each in one of the card holders 20. A card holder is best placed in the rack 10 by inserting one corner of it below one of the front flanges 14, 15 as illustrated in Fig. 3, then tipping it sufficiently to permit insertion of the opposite corner under the other flange 14 or 15. The holder is then swung into horizontal position in the rack and allowed to drop to the bottom of the rack where its lower edge rests on the projection 17. The engagement of the projection 24 of the holder with the back 11 tips the holder forward in inclined position as illustrated in Fig. 2. It should be noted that in this position the guiding portion 26 of the projection 24 lies close to the back 11 of the rack. The next card holder is similarly inserted in the rack and is allowed to drop down on the holder first inserted. As the guiding portion 26 of the projection 24 of the lower holder lies against the back 11 of the rack, the lower edge of the descending holder cannot pass behind this projection but necessarily descends in front of it on to the supporting portion 25 of the projection 24. With the lower edge of the holder thus supported in the projection 24 of the holder below, the engagement of the projection 24 of the holder just inserted with the back 11 of the rack causes the new holder to assume a forwardly inclined position as illustrated in Fig. 2. In this position the guiding portion 26 of its projection 24 lies close to the back 11 of the rack. Additional holders are inserted in the same manner, and as the holders fall each is supported by the holders below so that the holders are nested together as illustrated in Fig. 2.

After the index has been formed additional cards in their holders may easily be inserted or holders may be removed at any desired point in the index. To do this the card holder below which it is desired to insert the new holder or remove a holder is raised by engaging the finger or a pencil point below its flange 21. This raises all the cards above the card engaged. The lower edge of each holder is retained on the supporting portion 25 of the projection 24 of the holder below by the guiding portion 26 so that the cards remain nested together when raised. A new card is then inserted and allowed to fall into engagement with the holder below, or a holder or holders may be removed. The holders which have been raised are then dropped back to close the columns of nested holders in the rack.

It is frequently desirable to expose a greater portion of certain of the cards in the index for the sake of emphasis or for some other reason. The index shown in the drawings is arranged alphabetically and contains cards each bearing one letter of the alphabet interspersed in proper positions between the other cards. It is desirable to emphasize such initial cards by exposing a greater portion of them than of the other cards; this is accomplished by making the initial cards and their card holders $20_x$ wider than the other cards. In these wider card holders, however, the distance between the supporting portions 25 of the projections 24 and the upper edge of the card holder is the same as in the narrower holders, so that the same portion of the card in the holder next above the wide card holder is exposed as is the case with narrow holders above other narrow holders (see Fig. 2).

In order to permit the card holders to be inserted in the rack in the manner described and to insure the holders being retained in the rack after they are inserted, the dimensions of each holder are such that it has a diagonal length less than the distance between the walls 12 and 13, and that its horizontal length is greater than the distance from the inner edge of either flange 14 or 15 to the opposite wall of the rack. In order that the holders may be made long enough so as not to have too much end play between the side walls 12 and 13, it is desirable to slightly cut away one of the corners of the holders as shown at 27, so as to reduce the diagonal length of the holder through this corner. This is, however, not essential when comparatively narrow cards are used.

In the embodiment of the invention shown in Figs. 8 to 13, the rack 10' is the same as in the embodiment already described except that it is deeper, but the cards 30' and the card holders 20' are wider than those shown in the first embodiment. The rack is made deeper so as to accommodate the wider holders nested in inclined position. The projections 24' of the card holders 20' are placed near the bottoms of the card holders so that only a relatively small portion of the top of each card is exposed when the holders are nested as illustrated in Fig. 9. Each successive holder will thus take up no more space longitudinally of the rack than is taken by successive narrower holders, and a wide unexposed portion of each card is left for confidential or other data.

In order to permit the insertion of the wide card holders in the rack 10' one end of each holder 20' is inclined as shown at 27' and one end of the card to be placed in the holder is similarly cut away so that by tilting the holder it may be inserted in the rack beneath the front flanges as illustrated in Fig. 10.

In the embodiment of the invention shown in Figs. 14 to 16, the form of the rack 10'' is changed by omitting one of the front flanges. When this form of rack is used, wide card holders 20' rectangular at both ends as shown in Fig. 16 may be easily inserted in and removed from the rack. To insert a holder in the rack 10'', one of the holders is first placed against the side wall 12 under the flange 14 and the holder then swung back against the back of the rack and allowed to fall to position. When this form of rack is used, it should be supported so that it is slightly rearwardly inclined or in other suitable position to prevent the card holders falling forwardly out of the rack.

What is claimed is:

1. A visible index comprising in combination a rack having a back and a series of card holders slidably mounted in the rack, each card holder having a rearward projection adapted to support the lower edge of the holder next above and to engage said back, causing each holder to assume a forwardly inclined position in the rack.

2. A visible index comprising in combination a rack having a back and a series of card holders slidably mounted therein in the rack, each card holder having an inclined rearward projection forming an outwardly tapering socket to receive the lower edge of the holder next above and serving by engagement with the back to cause each holder to assume a forwardly inclined position in the rack.

3. A visible index, comprising in combination a rack having a back and a series of card holders slidably mounted in the rack, each card holder having a rearward projection located intermediate the upper and lower edge of the holder and including an inner portion adapted to support the lower edge of the next holder above, and an outer portion extending at an angle to the holder so as to lie close to the back of the rack and adapted to guide the lower edge of a falling holder on to the supporting portion, and to retain it thereon.

4. A card holder for a visible index having an overturned flange for holding a card against the front face thereof, and a rearward projection stamped from the body of the holder and forming a support for the lower edge of a similar holder, said flange being positioned so as not to interfere with the stamping out of said projection.

5. A card holder formed of a plate having an upturned flange covering its central bottom portion to retain a card against the front face of the holder, and rearward projections forming supports for the lower edge of a similar holder and punched from the body of the holder beyond the ends of said flange.

6. A visible index, comprising a rack, a plurality of overlapping independently removable card holders slidably mounted therein, each holder being provided with means for retaining a card against the front surface thereof and with a rearward projection forming a support for the lower edge of the holder above, certain of said card holders being wider than the others and the distance from the support to the upper edge of said wider cards being the same as the distance from the support to the upper edge of said narrower cards so that the narrower cards are exposed to a uniform depth while the wider cards are exposed to a greater depth than the narrower cards.

7. A visible index, comprising a rack having a back and opposite side walls and having front flanges extending inward from each of said side walls, and a card holder having means for retaining an index card against the front surface thereof, the length of said card holder being greater than the distance between either side wall of the rack and the edge of the opposite front flange so that the card holder is retained within the rack, and the distance between two opposite corners of said card holder being less than the distance from the two side walls of the rack so that the card holder may be readily inserted in the rack.

8. A visible index, comprising a rack having a back and opposite side walls, and having front flanges extending inwardly from said side walls, and a plurality of card holders each having means for retaining an index card against the front surface thereof, one end of each of said card holders and cards being inclined downwardly so as to permit the insertion of said card holder and card under said front flanges by tilting the card holder and card edgewise.

In testimony whereof I have hereunto set my hand in the presence of two subscribing witnesses.

WILLIAM P. DE SAUSSURE, Jr.

Witnesses:
A. Jarecky,
A. L. Kent.